United States Patent [19]

Gregan et al.

[11] Patent Number: 4,690,099

[45] Date of Patent: Sep. 1, 1987

[54] PULSATION ARRANGEMENT

[75] Inventors: David J. Gregan; Ronald H. Crowter, both of Hamilton, New Zealand

[73] Assignee: The National Dairy Association of N.Z., Auckland, New Zealand

[21] Appl. No.: 802,261

[22] Filed: Nov. 27, 1985

[30] Foreign Application Priority Data

Nov. 27, 1984 [NZ] New Zealand .................. 210351

[51] Int. Cl.$^4$ ............................................. A01J 5/04
[52] U.S. Cl. .............................. 119/14.41; 119/14.28
[58] Field of Search ................. 119/14.28, 14.29, 14.41

[56] References Cited

U.S. PATENT DOCUMENTS 3,117,553  1/1964  Dujardin et al. ................ 119/14.28
3,172,391  3/1965  Norton ............................ 119/14.28
3,776,189 12/1973  Fjermestad et al. ............. 119/14.28

Primary Examiner—Robert P. Swiatek
Assistant Examiner—Cary E. Stone
Attorney, Agent, or Firm—Holman & Stern

[57] ABSTRACT

A milking machine pulsation arrangement which includes a pulsation rate and ratio timing device in combination with a first coil and vacuum pulsator unit operated by the coil and at least one associated coil and vacuum pulsation unit controlled thereby, for controlling a plurality of milking machine pulsator units. A time delay device is connected to and associated with pulsation rate and ratio timing device and the at least one associated coil so that the time delay device is adapted to receive electrical current pulse of predetermined interval and duration and thereafter substantially reproduce the current pulse.

7 Claims, 1 Drawing Figure

PULSATION ARRANGEMENT

BACKGROUND TO THE INVENTION

1. Field of the Invention

This invention relates to a pulsation arrangement for use with milking machines, such as used in the dairy industry.

2. Description of the Prior Art

Up until this time numerous pulsation arrangements and systems have been known and used, for example in conjunction with milking machines used in the dairy industry. Such arrangements and systems have not however always been as straightforward and efficient as possible, and the present invention sets out to provide an arrangement which is efficient in use, and which overcomes or at least minimizes problems and disadvantages inherent in arrangements and systems known and used up until this time.

It is an object of the present invention to provide a pulsation arrangement which is straightforward in operation and use.

Other objects of the invention will become apparent from the following description.

BRIEF SUMMARY OF THE PRESENT INVENTION

According to one aspect of the present invention there is provided a milking machine pulsation arrangement, including pulsation rate and ratio timing means, which when combined with at least one coil and at least one vacuum pulsator unit, is capable of controlling one or more other pulsator units.

According to a second aspect of the present invention there is provided a milking machine pulsation arrangement including pulsation rate and ratio timing means, in combination with at least one coil and at least one vacuum pulsator unit, at least one time delay means being connected to and associated with at least one coil and at least one vacuum pulsator unit, the arrangement being such that said at least one time delay means is so adapted as to receive electrical current pulse of predetermined interval and duration, thereafter substantially reproducing said current pulse.

According to a third aspect of the present invention there is provided a milking machine pulsation arrangement including a pulsation rate and ratio and timing means, which when combined with at least one coil and at least one vacuum pulsator unit, is capable of controlling one or more other pulsator units, a plurality of time delay means being provided and being connected to respective coil and pulsator unit assemblies, the arrangement being such that said time delay means are capable of receiving an electrical signal and therefore substantially reproducing said signal after a predetermined period of time.

BRIEF DESCRIPTION OF THE DRAWINGS

The present invention will be described by way of example only, and with reference to the accompanying drawing, wherein.

DETAILED DESCRIPTION

Figure 1:
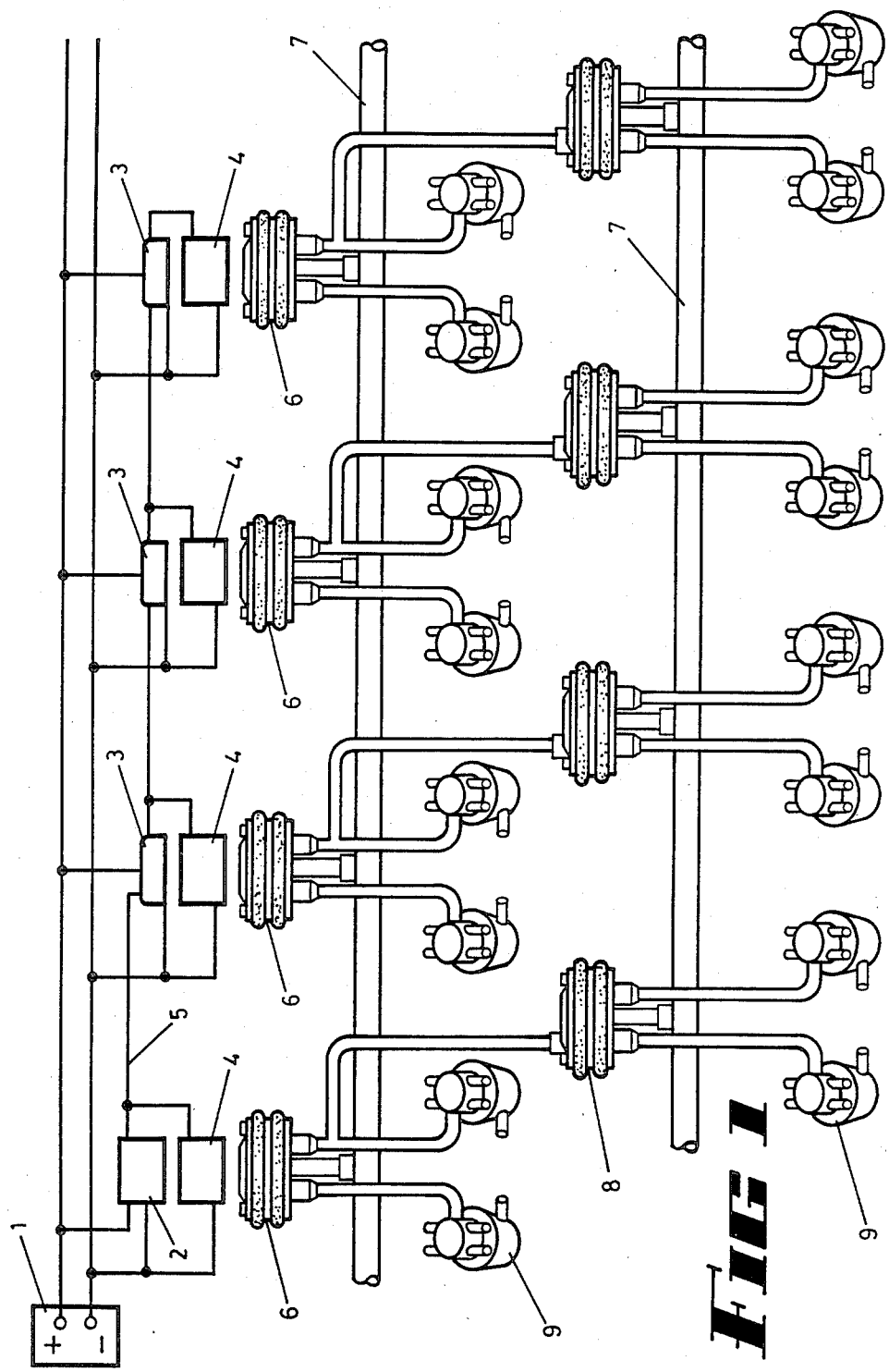
FIG. 1 is a schematic view of a pulsation arrangement according to one form of the present invention.

Throughout the specification and claims reference is made to the term "modules", as referring to various components of the arrangement of the present invention. In referring to the term "modules", reference is made to components which are able to be inserted and removed from the arrangement in a straightforward and efficient manner, such as for example in an essentially "plug in" manner, to enable straightforward and efficient replacement, repair, removal and the like. The module components of the present invention, allow the arrangement to be adapted to varying milking machine arrangements, of almost any size, type or manufacture.

In the preferred form of the invention as shown in the accompanying drawing, a power source is generally shown at 1, the power source preferably being a low voltage electric power source. In the preferred form of the invention this power source 1 is connected, such as by appropriate wiring means, to a rate and ratio timing means 2. The rate and ratio timing means 2 can be electronic or electrical.

In the preferred form of the invention the rate and ratio timing means 2 is essentially in the form of a substantially "master" module component, which is capable of being plugged into and out of the arrangement of the present invention. This then allows timing means to be interchangeable, or replaced, depending upon the desires of the user. For example, a user may require different combinations of components or different timing means, and rather than replacing the apparatus as a whole, or spending large amounts of time on adjustment, maintenance or repair, the timing means 2 in an essentially module form, can be replaced and essentially plugged into and removed from its position within the arrangement. For example, a user may require different rates and/or ratios, and can use differing rate and ratio timing means 2, in different module forms, depending upon the desires of the user.

If desired the timing means 2 may be a substantially unitary or fixed fixture or fitting, although it is preferred and advantageous for it to be in a substantially module form.

Referring further to the present invention, the power source 1 and timing means 2 are preferably connected or connectable to time delay means, in the form of time delay means 3. The time delay means 3 is preferably in a module form, and is linked, so as to control the action of, electromagnetic coils 4. Appropriate wiring such as 5, connects the power source 1 with timing means 2, time delay means 3 and with coils 4. In a preferred form of the invention, the time delay means 3 are in the form of modules, which are again capable of being plugged into and/or removed from the arrangement of the present invention.

Each time delay means 3 is preferably connected to and associated with a coil 4 and pulsator unit 6. Each pulsator unit 6 is connected to one or more vacuum pipes or lines 7. As will be appreciated from FIG. 1 of the accompanying drawings, the pulsator unit 6 can be connected such as by vacuum tubes, to conventional slave type pulsator units 8.

This is however by way of example only, and pulsator units 6 and 8 may be conventionally connected to standard claw/teat cluster assemblies, of milking machines, such as shown at 9 in the accompanying drawing.

While the timing means 2 and time delay means 3 are described above as being in substantially module form, it should be appreciated that other components of the present arrangement, such as for example the power source 1, the coils 4, wiring 5; the pulsator unit 6 and the slave pulsator units 8, may also be provided in substantially module or unit form, which are capable of being plugged into and removed from the arrangement of the present invention.

It should be appreciated that the provision of such features in substantially module form again allows ready interchangeability of the components and removal and location for repair, replacement, modification and the like.

In the present invention, the timing means 2 effectively acts as a master or control unit of the arrangement, which controls the rate and ratio of the pulsation arrangement. This is done by acting through the coils 4 and pulsator units 6 connected to the timing means 2. It is also achieved by controlling other coil and pulsator assemblies, such as shown in the accompanying drawings, by way of time delay means 3.

As shown in the accompanying drawing, a plurality of time delay means 3 may, in one form of the invention, be provided in substantially module form and each delay module 3 may be associated with its own coil 4 and pulsator assembly 6. Thus, in use, time delay means 3 will reproduce an electrical signal as produced by the timing means 2, at a delayed and predetermined time interval.

It should be appreciated that the time delay means 3 may be preset or fixed, at an appropriate time, or alternatively they may be variable, so that the setting and timing can be adjusted.

Thus, in use, the time delay means 3 are provided or set, so that they will receive a signal froam the timing means 2, and following a predetermined and set period of time, substantially the same signal will be produced by the time delay means 3, to be sent to further or subsequent time delay means 3 and associated coil 4 and pulsator units 6.

The time delay means 3 are, as referred to above, preferably formed or provided so that their time delay output is variable. The time delay means are however able to be provided with fixed settings and time delay intervals.

In the present invention therefore it will be appreciated that there are real advantages in providing the time delay means 3 in substantially module form, so that different time delay modules may be inserted into and removed from the arrangement of the present invention, to thus vary and adjust the time delays required. If the time delay means 3 is not provided in module form, then the arrangement is fixed to one particular setting, or alternatively the delay means must be adjusted by an operator. It will be appreciated that the straightforward replacement of module units is far more straightforward and efficient. It also allows for constant repair and maintenance.

In preferred forms of the present invention, any number of time delay means 3 can be used, be they fixed or part of the arrangement, or alternatively be they in substantially module form.

In a preferred form of the invention, the time delay means 3 are so adjusted, and/or set or predetermined, that an even "ripple" pulse distribution pattern is brought about throughout the milking machine and arrangement.

Referring to the accompanying schemmatic drawing in FIG. 1 of the drawings, it should be appreciated that this is by way of example only. Thus, it should be appreciated that more than one timing means 2 can be used if desired, depending of course upon the requirements of the user. For example, a plurality of such timing means 2 can be used if desired, preferably in substantially in module or "plug in" form. This then provides, as referred to above, varying rates and ratios; for example varying rates and ratios in different sections of a milking machine arrangement.

The slave pulsator units shown in the accompanying drawing are such, that it should be appreciated that more than one such unit can be provided if desired.

In a preferred form of the invention, described by way of example with reference to the accompanying drawing, the timing means 2 is used in connection with a plurality of time delay means 3. It should be appreciated however that in other forms of the invention the timing means 2 can be used substantially on their own in substantially "module" or "plug in" form, without the provision of subsequent time delay means 3 being connected with each set of coil and pulsator unit.

It should further be appreciated that the present invention provides for the time delay means 3, which is capable of combining in use with a coil and pulsator unit, the time delay means 3 being capable of receiving an electrical signal and reproducing a substantially identical or similar signal, after a predetermined or set time delay. Furthermore, the invention provides a particularly efficient feature in the form of time delay means combining with the coil and pulsator, the time delay means being capable of receiving an appropriate electrical signal and a current pulse, of given or set interval duration—for example, receiving such an electrical current pulse from the timing means 2 or from a spaced apart, but adjacent and earlier operated operating time delay means 3. Following receipt of such a current pulse, and following the expiration of a predetermined or set period of time, the time delay means 3 is able to substantially reproduce the pulse in a virtually identical pattern (but after a fixed or predetermined period of time) as an electrical and/or pneumatic signal, separately or substantially simultaneously.

This invention has been described by way of example only and it should be appreciated that modifications and improvements may be made to the invention without departing from the scope thereof as defined by the appended claims.

We claim:

1. A milking machine pulsator arrangement for operating a plurality of milking claws comprising:
   a plurality of pulsator units each of which comprises a valve means operatively connected to a separate milking claw means for controlling alternative application of atmospheric and vacuum pressure to operate each respective milking claw means and a separate electric coil means operatively associated with each respective valve means for individually operating said valve means;
   a pulsator rate and ratio timing means operatively associated with a first one of said plurality of pulsator units for operating the coil means of said first one of said units;
   time delay means operatively associated with each of the other of said pulsator units for individually operating the respective coil means of each of said other units;
   an electric power source; and
   electrical conduit means connecting said power source to each of said coil means and connecting said pulsator rate and ratio timing means between said power source and each of said time delay means;

so that said pulsator rate and ratio timing means controls the operation of the coil of said first one of said units and provides an electric pulse after a predetermined time delay to said time delay means of each of said other units for operating the respective coils of said other units in succession after a respective predetermined time delay.

2. A milking machine pulsator arrangement as claimed in claim 1, wherein the pulsator rate and ratio timing means is in substantially module form.

3. A milking machine pulsator arrangement as claimed in claim 1, wherein said time delay means is in substantially module form.

4. A milking machine pulsator arrangement as claimed in claim 1, wherein at least one time delay means is variable in setting.

5. A milking machine pulsator arrangement as claimed in claim 4, wherein said time delay means are so varied or, that said pulsator arrangement is provided with a substantially even "ripple" pulse distribution pattern.

6. A milking machine pulsator arrangement as claimed in claim 1, wherein at least one time delay means is of a fixed setting.

7. A milking machine pulsator arrangement as claimed in claim 1 wherein at least one of said pulsator units, said coil means, and said time delay means is in substantially module form.

* * * * *